UNITED STATES PATENT OFFICE.

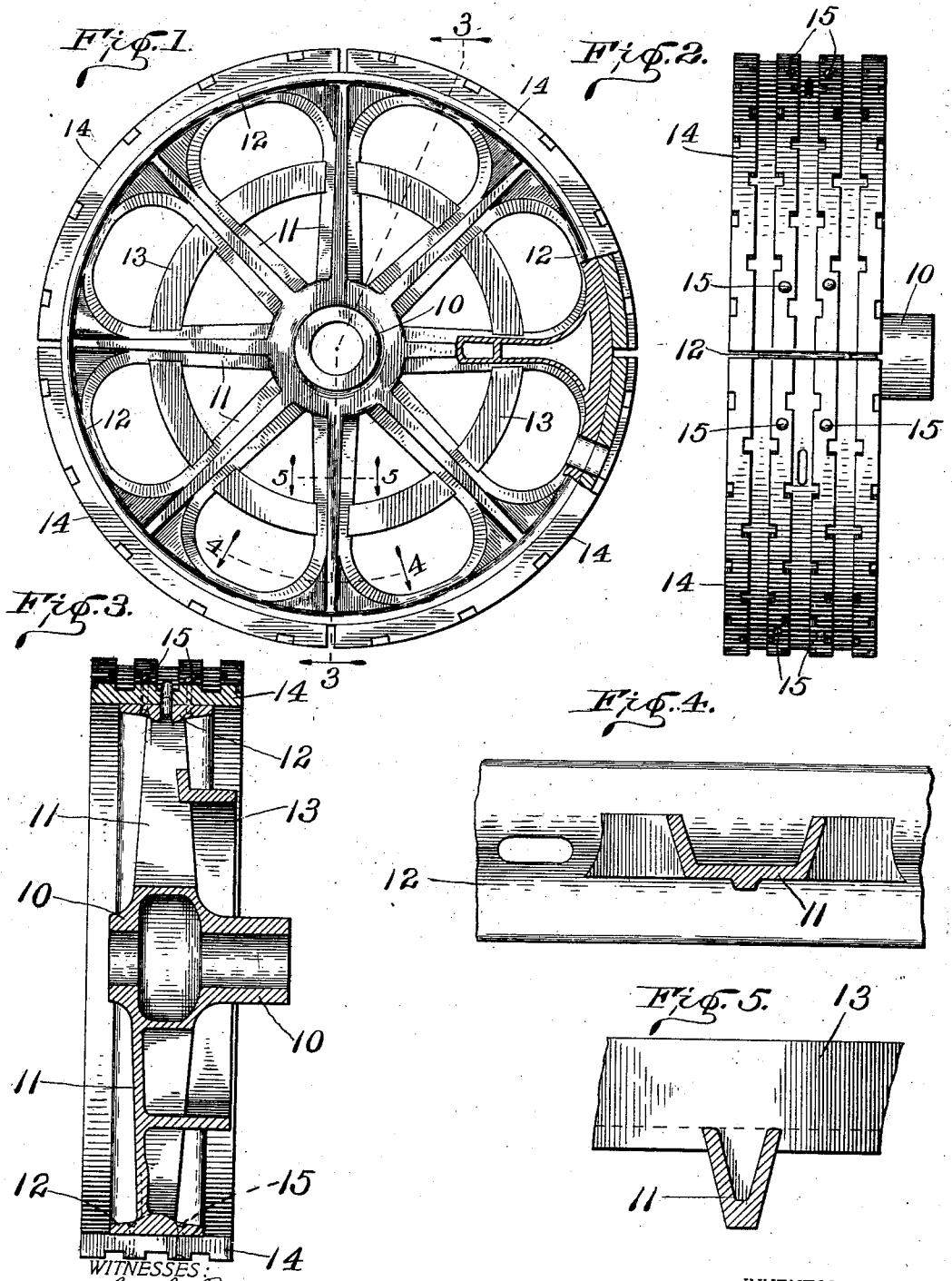

PAUL H. WHITE, OF INDIANAPOLIS, INDIANA, ASSIGNOR TO WHITE STEAM WAGON COMPANY, OF INDIANAPOLIS, INDIANA, A CORPORATION OF INDIANA.

VEHICLE-WHEEL.

SPECIFICATION forming part of Letters Patent No. 699,994, dated May 13, 1902.

Application filed November 29, 1901. Serial No. 84,116. (No model.)

*To all whom it may concern:*

Be it known that I, PAUL H. WHITE, a citizen of the United States, residing at Indianapolis, in the county of Marion and State of Indiana, have invented certain new and useful Improvements in Vehicle-Wheels, of which the following is a specification.

The object of my said invention is to produce a wheel of great strength and capacity especially suitable for use with heavy vehicles—such as are used for transportation purposes, as drays and the like—and which shall also be very durable and require but few repairs and with but a moderate initial cost. Said invention principally consists in a unitary cast center and a sectional cast tire of peculiar form, as will be hereinafter more particularly described and claimed.

Referring to the accompanying drawings, which are made a part hereof and on which similar reference characters indicate similar parts, Figure 1 is a side elevation of a wheel embodying my said invention, some portions being broken away or shown sectional for the purpose of more clearly illustrating the construction; Fig. 2, an edge elevation thereof especially illustrating the form of the surface of the sectional tire; Fig. 3, a vertical sectional view as seen when looking in the direction indicated by the arrows from the dotted line 3 3 in Fig. 1; and Figs. 4 and 5, detail transverse sectional views of the spokes of the wheel, showing the form thereof in cross-section at the points indicated by the dotted lines 4 4 and 5 5, respectively, in Fig. 1.

The wheel-center, as above indicated, is a unitary structure and is cast from steel. It has a hub 10, a series of spokes 11, and a rim or felly 12. Upon the spokes at a point intermediate the hub and rim I also prefer to form a flange 13 for the purpose of applying a power connection for driving the wheel when used in heavy automobile delivery-wagons or other traction-vehicles. The spokes 11 are V-shaped in cross-section for the purpose of giving the same a maximum of rigidity and strength with a minimum of weight and at the same time providing a large surface with which the flange 13 may unite thereto. Said spokes also preferably diverge or branch at the ends, as shown, thus the better supporting the rim and bracing and strengthening the wheel as a whole, as will be readily understood. The hub 10 is cast in the form of a hollow shell, being cored out, as best shown in Fig. 3. Said hub may be bored out to receive the axle-spindle directly, in which case the central cored-out portion will serve as a lubricant-chamber, or a skein may be fitted therein, as is the practice in the case of heavy wooden hubs.

The tire is composed of a suitable number of sections, also formed from steel, which are secured to the rim 12 of the wheel by means of rivets 15. I have shown the tire as composed of four of these sections 14, which I consider to be a convenient and economical number. The traction-surfaces of these tires or tire-sections, which are of a considerable width, are of a peculiar form. Said surfaces contain suitable channels or grooves running circumferentially of the tire and having lateral wings or branches, forming cavities or "pockets" which are adapted to engage with any protuberances which may be present on the surfaces over which the vehicle is traveling, such as cobblestones and the like. The branches of adjacent grooves occupy a staggered relation to each other, as shown, which obviously increases their effectiveness as well as providing for a better distribution of the metal of which the tire is composed. This construction of tire-surface is very efficient in the matter of preventing slipping, thus giving the vehicle increased power, as will be readily understood.

Ordinary continuous tires, especially where the vehicle to which they are applied is engaged in the carrying of heavy loads and particularly where they are subject to the impact or hammering action of cobblestone or other uneven or hard pavements, become elongated and therefore loose and require resetting. In my improved wheel the rim of the wheel-center is sufficiently strong, so that no addition to its strength by means of a tire is necessary, and I am therefore enabled to make the tire sectional. In doing this I make each of the sections slightly shorter than the proportion of the wheel-rim to which it is attached, thus leaving slight spaces between the ends of the several sections. Any such elongation of the tire parts as results from use is thus provided for, and the tires will neither become loose nor break the bolts or rivets by which they are attached to the wheel-rim. They are therefore enabled to endure harder and longer use than continuous tires.

Having thus fully described my said invention, what I claim as new, and desire to secure by Letters Patent, is—

1. A vehicle-wheel having its central portion formed integrally of cast metal, and comprising a central hollow hub, a series of spokes V-shaped in cross-section, a peripheral rim surrounding said spokes at their outer ends, and a sectional tire connected to said rim, all substantially as shown and described.

2. The combination, in a vehicle-wheel, of an integral central portion comprising a hub, spokes and rim, and a tire composed of sections secured to the outer surface of said rim, the traction-surface of said tire having grooves with short lateral branches forming pockets, substantially as set forth.

3. The combination, in a vehicle-wheel, of a central portion, and a tire secured to the periphery thereof, said tire having grooves in its traction-surface, and said grooves having branches forming cavities or pockets arranged in staggered relation to each other, substantially as set forth.

In witness whereof I have hereunto set my hand and seal, at Indianapolis, Indiana, this 22d day of November, A. D. 1901.

PAUL H. WHITE. [L. S.]

Witnesses:
CHESTER BRADFORD,
ALBERT F. ZEARING.